(No Model.)
G. E. PALMER.
HANDLE FOR POT AND OTHER COVERS.
No. 310,716. Patented Jan. 13, 1885.
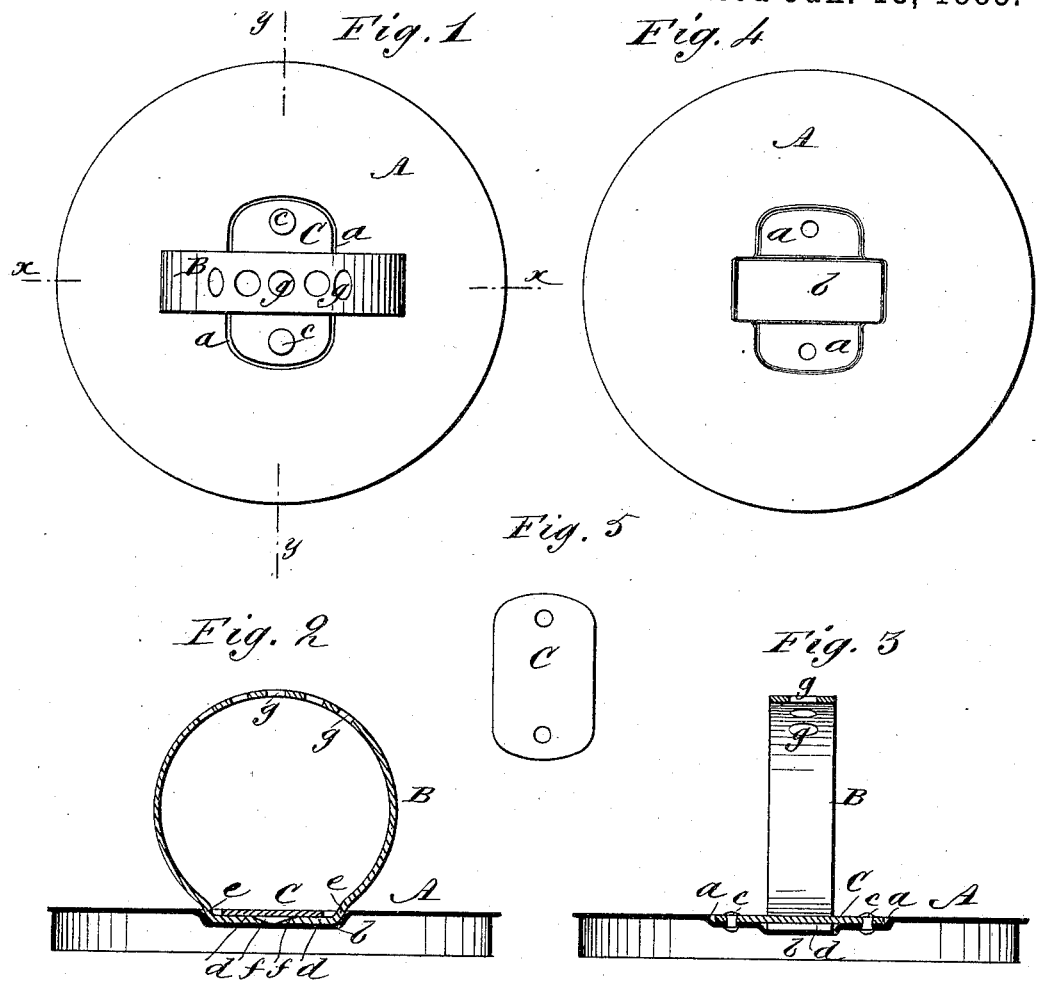
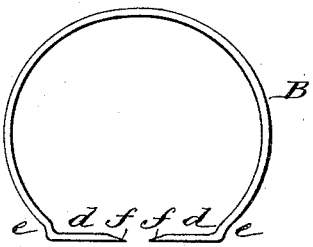
WITNESSES:
C. Neveux
C. Sedgwick
INVENTOR:
G. E. Palmer
BY Munn & Co.
ATTORNEYS.

UNITED STATES PATENT OFFICE.

GEORGE E. PALMER, OF HORSEHEADS, NEW YORK.

HANDLE FOR POT AND OTHER COVERS.

SPECIFICATION forming part of Letters Patent No. 310,716, dated January 13, 1885.

Application filed January 14, 1884. (No model.)

*To all whom it may concern:*

Be it known that I, GEORGE E. PALMER, of Horseheads, in the county of Chemung and State of New York, have invented certain new and useful Improvements in Handles for Pot and other Covers, of which the following is a full, clear, and exact description.

This invention relates to ring or loop shaped handles for use on pot and other covers; and it consists in a novel construction of the handle and in the means of attaching it to the cover, substantially as hereinafter described, and whereby the handle is made readily attachable and detachable, which facilitates packing and shipping, may be held in its place without solder, which when exposed to heat is liable to loosen, and when attached and in use will always occupy an upright position, thereby keeping comparatively cool when applied as a handle to a stove or other pot cover, and always being in a convenient position for grasping by the hand, in all of which respects it has the advantage over the ordinary permanently-attached drop-ring handle of pot and other like covers.

Reference is to be had to the accompanying drawings, forming a part of this specification, in which similar letters of reference indicate corresponding parts in all the figures.

Figure 1 represents a plan of a pot or other cover with handle attached, in illustration of my invention. Fig. 2 is a vertical section on the line $x\,x$ in Fig. 1, and Fig. 3 a further vertical section on the line $y\,y$ in Fig. 1. Fig. 4 is a top view of the cover, with the handle and its holding-plate removed. Fig. 5 is a plan of the plate used to hold the handle in position on the cover, and Fig. 6 a side view of the handle detached.

A is a pot or other cover to which the detachable handle B is designed to be applied. In the top of this cover A, preferably in the central portion thereof, two grooves or depressions, $a$ and $b$, crossing each other, are made, the one, $b$, which is deeper than the other, interrupting the depression $a$. These depressions may be stamped or otherwise made in the cover. The interrupted groove or depression $a$ serves to receive within it a handle-holding plate, C, which is secured by end rivets, $c\,c$, to the cover, and the upper surface of which is flush with the top of the cover, or thereabout. The deeper depression $b$ forms shoulders or walls on its opposite sides and ends for support of the entering portion of the handle. The handle B, which may be made of wrought-iron, steel, or other elastic or yielding material, is of a flat loop or ring shape, interrupted or broken below, and with its interrupted end portions, $d\,d$, constructed to form flat or straight tongues or feet, and with jogs or shoulders $e\,e$ where they join the circular portion of the handle, to bear against the ends of the depression $b$ when the handle is in position. The adjacent or forward ends of these tongues or feet $d\,d$ are sharpened or beveled off, as at $f\,f$, to facilitate the entry of the handle to its place. Furthermore, perforations $g$ may, if desired, be made in the upper portion of the handle. The plate C may be made of wrought-iron, or of any other suitable material.

When it is desired to attach the handle B to the cover, said handle is forced or sprung so as to enter its feet $d\,d$ within the depression $b$, and under the plate C, fast on or within the cover or depression $a$ thereof, the shoulders $e\,e$ and walls of the depression $b$ aiding, in conjunction with the plate C, to firmly hold the handle in an upright position, convenient for grasp by the hand, and less liable to become heated than the drop-ring ordinarily in use on pot-covers; nor is there any occasion to use solder for fastening the handle to its place, the plate C being secured by rivets; neither are any perforations, allowing for the passage of steam or heat, necessary in the groove or depression in which the feet $d\,d$ of the ring-handle fit. This detachable handle provides for a much closer packing of the covers in shipping, and, being in socketed connection with the cover, it is readily applied and secured in its place.

Having thus described my invention, I claim as new and desire to secure by Letters Patent—

1. A detachable loop or ring shaped handle for pot and other covers, formed of a single piece of spring material, and interrupted at its base, and constructed with flattened tongues or feet adapted to form a socketed connection with the cover, and to hold the handle, when attached, in an upright position on the cover, substantially as specified.

2. The detachable flat and elastic or yielding ring-shaped handle B, interrupted at its base, and constructed with engaging feet or tongues $d\,d$, in combination with the cover A, having cross grooves or depressions $a\,b$, of different depths, in its top, and the plate C, secured on and within the shallower one of said grooves, essentially as and for the purposes herein set forth.

3. The divided ring-shaped detachable cover-handle B, constructed with flat straight feet $d\,d$, sharpened or beveled at their adjacent ends, and made to form jogs or shoulders $e\,e$ at their junction with the curved portion of the handle, substantially as and for the purposes herein described.

GEORGE E. PALMER.

Witnesses:
THOMAS HIBBARD,
ISAAC CHAPMAN.